United States Patent
Hong et al.

[19]

[11] Patent Number: 6,130,970

[45] Date of Patent: Oct. 10, 2000

[54] METHOD AND DEVICE FOR GENERATING AN UNIFORMALIZED LASER BEAM PROFILE BY APPLYING THE MULTI-DIMENSIONAL DOUBLE BENDINGS OF AN OPTICAL FIBER

[75] Inventors: Jong Hee Hong, Kwacheon; Jung Woo Phark, Anvang; Won Sik Lee, Seoul, all of Rep. of Korea

[73] Assignee: National Institute of Technology and Quality, Rep. of Korea

[21] Appl. No.: 09/068,912

[22] PCT Filed: Nov. 22, 1996

[86] PCT No.: PCT/KR96/00209

§ 371 Date: May 19, 1998

§ 102(e) Date: May 19, 1998

[87] PCT Pub. No.: WO97/18920

PCT Pub. Date: May 29, 1997

[30] Foreign Application Priority Data

Nov. 23, 1995 [KR] Rep. of Korea ...................... 95-43332

[51] Int. Cl.[7] ...................................... G02B 6/26
[52] U.S. Cl. .............................................. 385/28
[58] Field of Search .................. 385/28, 32, 31, 385/147; 372/6, 7, 8

[56] References Cited

U.S. PATENT DOCUMENTS

| | | | |
|---|---|---|---|
| 4,889,403 | 12/1989 | Joseph et al. ............................ | 385/32 |
| 5,452,382 | 9/1995 | Takashi et al. .......................... | 385/31 |
| 5,764,838 | 6/1998 | Masanori et al. ....................... | 359/328 |
| 5,771,322 | 6/1998 | Kiyoto et al. ............................ | 385/31 |
| 5,812,707 | 9/1998 | Takashi et al. .......................... | 385/1 |

*Primary Examiner*—Akm E. Ullah
*Attorney, Agent, or Firm*—Leonard Bloom

[57] ABSTRACT

The invention relates to the method and device for generating the uniformalized laser beam, wherein passing through a triplet alpanatic convex lens, the focal point size is minimized, after the condensed laser beam being incident upon the optical fiber and passing through the bent optical fiber in circle form in first and second place (and third plane) each vertically arranged, is uniformed by accelerated screw increments and diffused reflections, the laser energy condensed in the center portion is diffused uniformly all over the section area, and also one base plate formed on which one bending guide for winding and suspending the optical fiber passing through each circular and local bending, and one local bending adjusting portion for shaping the said fiber wound around the local bending portion of said bending guide into locally bent form are fixed each other of one bending portion, by arranging and fixing said two bending portions vertically each other, the optical fiber is put in order along the bending guide surface for two portions.

9 Claims, 16 Drawing Sheets

METHOD AND DEVICE FOR GENERATING AN UNIFORMALIZED LASER BEAM PROFILE BY APPLYING THE MULTI-DIMENSIONAL DOUBLE BENDINGS OF AN OPTICAL FIBER

BACKGROUND OF THE INVENTION

The invention relates to the method and device for generating an uniformalized laser beam profile by using an optical fiber.

The laser beam can be transferred up to far distance due to its satisfactory parallelism and focused on geometrically and optically in case said beam is brought sharply to a focus by a convex lens, by which result very high energy density concentrated on an infinitesimal area is obtainable on the infintesmal area, and also as said beam has monchrom color as a pure mono color excluding all the other wave components and a characteristcs travelling straight without dispersion even through the prism, it is widely used for machining (material cutting, machining, drilling, welding, marking etc) or for measuring various heat properties of the industrial materials by the laser beam flash method etc.

However, in measuring heat properties of the industrial material by the laser flash method, YAG Laser or Ruby Laser under non uniformalized distribution has been used, and in case of using said beam, about 5% deviation error of the energy level during measuring thermal diffusivity results due to non uniformly heated test pieces, and further in case of machining the material by said beam such as cutting, drilling, welding, or marking the machined surface is not smooth togethr with difficulty of precise machining due to using said beam with non uniformalized profile.

Therefore in order to uniformalize an laser beam, by passing some partial laser beam through an optical fiber system and utilizing it undercondensed state at the center portion, some negative effects due to its non-uniformalization can be reduced more or less, but machining requiring more precision such as for thin plates or small components or local heat treatment is not so satisfactory as expected.

And as some different means for uniformalizing the laser beam, those of projecting the beam aslant on an optical fiber, or on bundle of the optical fiber and applying one dimensional local bendings to the optical fiber had been proposed.

However, as a method of projecting, a laser beam aslant on an optical fiber system had much energy loss in case projected on the fiber which result indicated a negligible uniformalized effect without any practical application, and also a method of projecting a beam on a bundle of fibers had not a success in the practical application due to some burning defects of the fiber along which clearance of boundary surface the beam passed through, despite consderable improvement of an uniformalization without any application.

Further, the method of one dimensional local bendings applied on an optical fiber system was found for a laser beam to be uniformalized markedly without any practical success under study only because of a bending effect due to the symmetrical bending offset each other, and further due to difficult regeneration without any determination for a clear bending condition and impossible uniformalization of high level.

SUMMARY OF THE INVENTION

The objective of the invention is to provide a method and a device for generating an uniformalized laser beam dissipating the energy energy concentrated on a center portion over whole the sectional area by accelerating increment of screw rays for said beam regardless of its incidence angle passing through an optical fiber at the same time through eliminating offset effect of an uniformalized profile from the previous one dimensional symmetrical bendings by a multi dimensional circular bendings such as two and three dimensional profiles.

The other objective for the invention is to conceive a method and device for generating an uniformalized laser beam, wherein preventing energy loss through the clad by providing larger incident angle at the boundary surface between core and clad than the critical one added with multidimensional circular bendings and several local bendings toward the reverse direction of the former, obtaining an uniform energy distribution throughout the section at the end of optical fiber by accelerating said beam dissipation by diffused reflections.

Further, the other objective for the invention is to provide a method and device for generating an uniformalized laser beam, wherein minimizing the focal point by passing through a triplet aplanatic convex lens, and minimizing incident loss through reflecting on an incident surface of an optical fiber in case a laser beam is projected into an said fiber vertically on said surface.

Further, the other objective of the invention is to provide with a method and device for generating an uniformalized laser beam, wherein preventing from burning loss of an optical fiber section due to projection of an laser beam by installing an optical fiber section just behind the focal point of a convex lens.

Further, the other objective of the invention is to provide with a method and device for generating an uniformalized laser beam so that may be practially and widely applied to measuring of multi property for the industrial material or machining of said material or medical treatment etc with such good quality of a laser beam.

DETAILED DESCRIPTION OF THE INVENTION

The method of generating an uniformalized laser beam based on the invention is fully described as follows:

At first let us observe the principle for generating an uniformalized laser beam.

In case a standard laser beam which energy density of its center portion is not uniformly distributed, is brought sharply to a focus by convex lens passed through a step index optical fiber, said beam is reflected with multi modes depending on the refraction angle, and transformed of screw rays passing through the center portion due to small bending or non-symmentry of the section. As the result, an outlet section of an optical fiber has symmetrical distribution of high energy level for the center portion.

Consequently, energy distribution for a laser beam is uniformalized by accelerating increment of screw rays and diffusivity through applying characteristics of a step index optical fiber.

Figure 1:
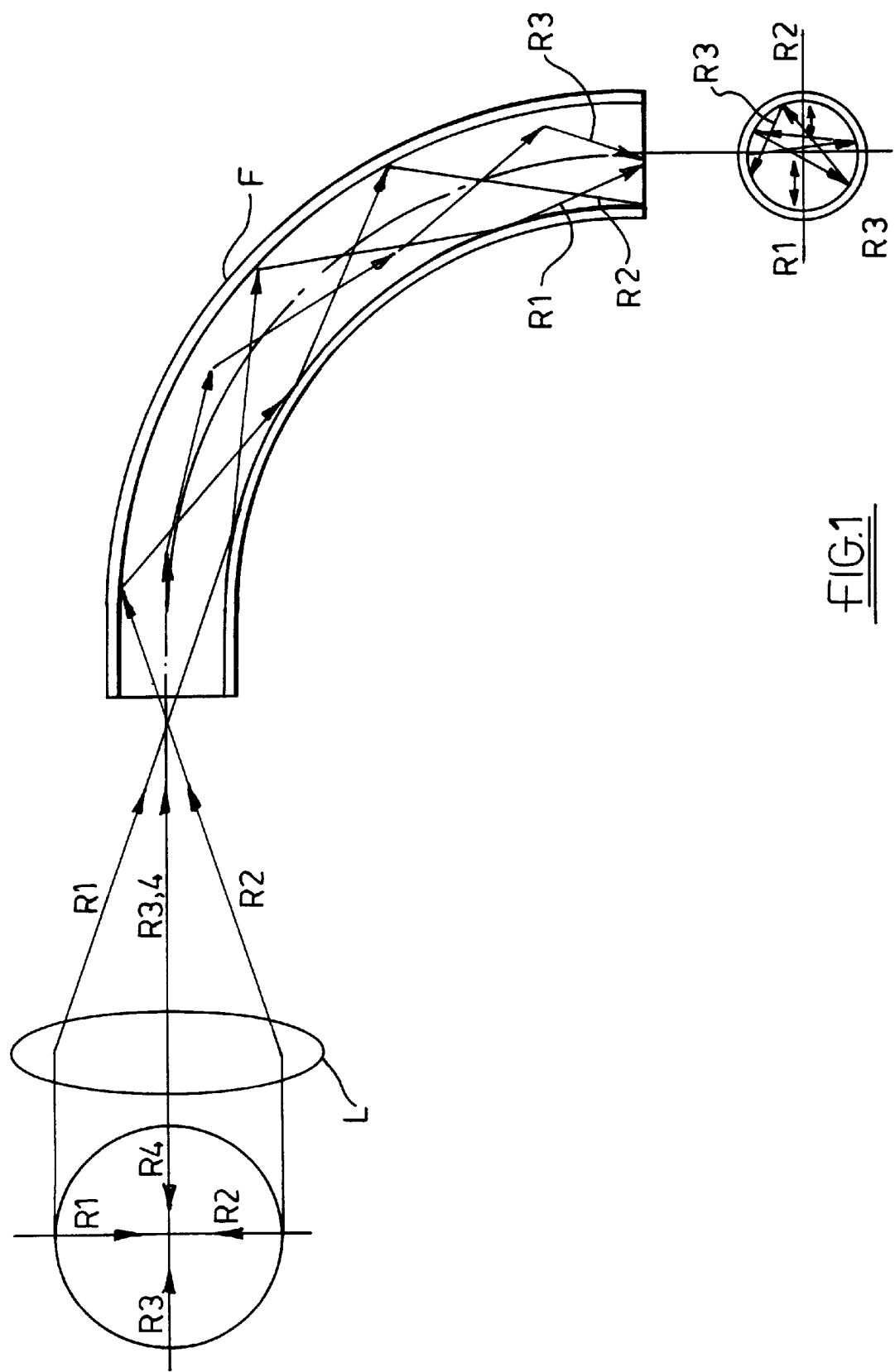
FIG. 1 shows a principal view demonstrating the invention of uniformalizing by way of screw transformation of laser beam by bending an optical fiber.

FIG. 1 shows a pattern which laser beam is transformed into screw rays by bent on an optical fiber, and condensed energy level diffused to fiber boundary.

In case observing progress of incident rays of top and bottom(R1, R2) and incident rays(R3, R4) of right and left direction condensed through a convex lens(L) mounted at an incident side of an optical fiber(F) at an outlet section of an optical fiber(F), the incident rays of top and botton(R1, R2) having same direction of bending for an optical fiber change their directions only, repeating reflections only passing through the center of an optical fiber(F), meanwhile the incident rays for right and left(R3, R4) at an angle of 90° with a bent direction for an optical fiber(F) dissipate energy level, transforming into screw rays by the directional change at a bent portion after passing through the center of an optical fiber(F) at first.

In case the first bent direction and the other second bent direction for an optical fiber(F) are added, the incident rays for top and bottom are transformed into screw rays through second bendings.

Therefore, in case of supplementing two or three dimensional bendings to a step index optical fiber based on above mentioned principle, projected laser beams from all the directions are transformed into screw profile and the laser beam composed of the bundle of the light which condensed high energy level is dissipated toward the outskirts is accelerated into symmetrical uniformalization.

However, the screwed laser beam under three dimensional circular bending has a smooth wave form of symmetrical distribution only without any perfect uniformalization.

Therefore, the invention prevents focused condensation of screwed beam making wave form distribution by making the beam diffused reflection at local bending portion, further accelerating increment of screw rays by supplementing double reversed directional local bendings which has less tangential length and radius of the curvature than the circular bendings against its direction in addition to multi dimensional circular bendgings to an optical fiber.

Figure 2:
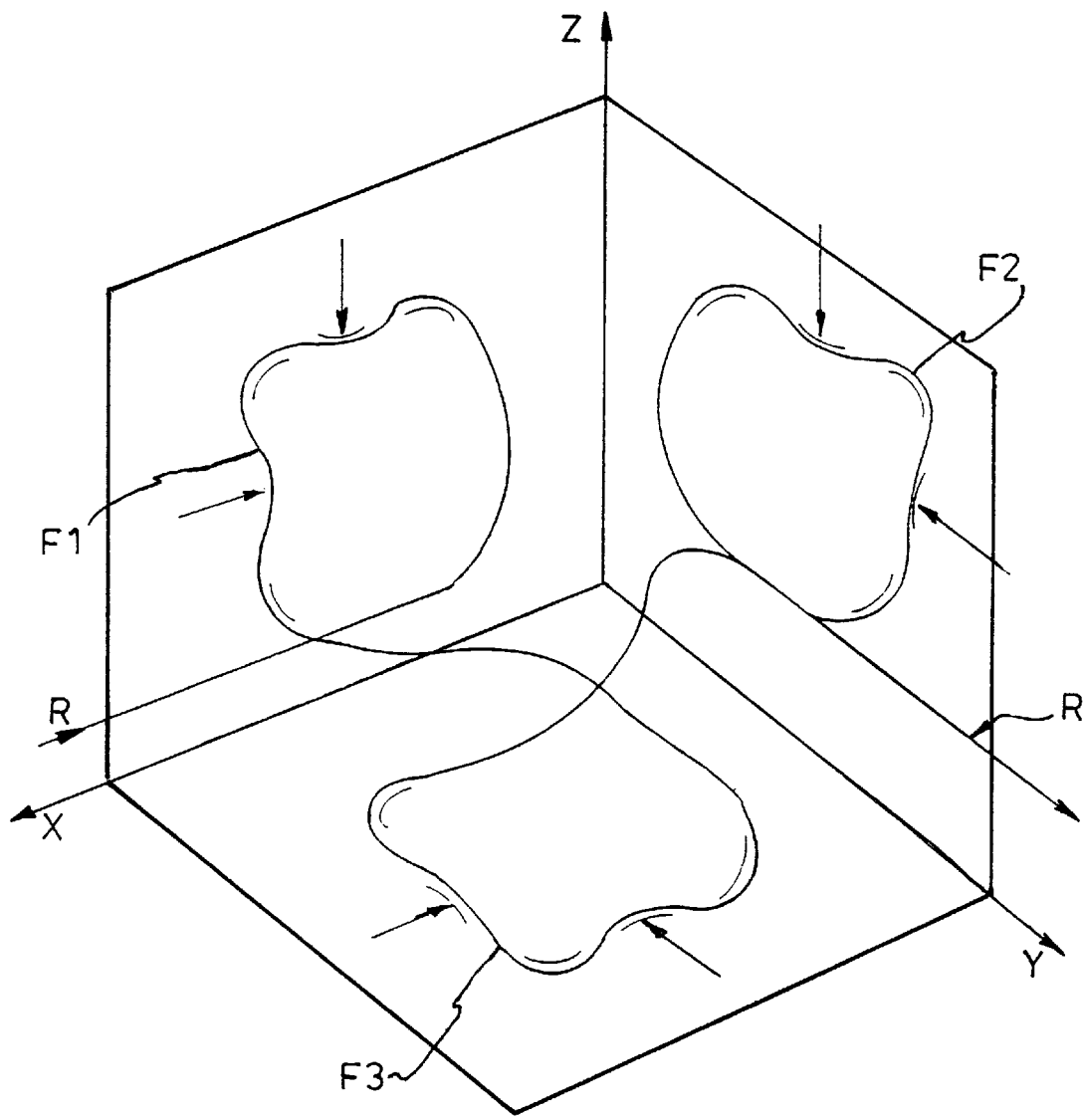
FIG. 2 shows a three dimensional double bending method for maximizing uniformalizing efficiency of a laser beam under bendigs.

FIG. 2 shows a conceptive view as one example of a practical application for a method uniformalizing a laser beam applied by three dimensional double circular and multi local bendings.

To obtain an uniformalized laser beam over all the section for an optical fiber, progressing of the screw formed laser beam and accelarating of the diffused reflection would be required, and said progressing of screw formed beam makes focused energy level dissipate to the outskirts and symmetrical distribution of the points establish, and accelerating diffused reflection, transforming the circular symmetrical distribution into those of plane profile by dissipating the reflection angle of the beam.

The invention accelerating the screw form and the diffused reflections of the laser beam at the same time as one of the most efficient method so that the laser beam may be projected according to a definite incident condition(late described).

The optical fiber is arranged on each three plain, wherein on XZ plane(1st plane), 1st bending optical fiber(F1) having local bendings together with circular bending portions, on ZY plane(2nd plane), 2nd bending optical fiber(F2) having cirular and local bending portions, and on YX plane, 3rd bending optical fiber(F3) having circular and local bending portions, each are placed in order.

Thus, after the laser beam condensed by a convex lens on the incident side is projected on an optical fiber, wherein passing through 1st bending portion in circle on ZX plane, the beam is transformed mostly into screw rays passing through fiber center portion. In this case by supplementing local bendings having small radius of curvature bent contrary to the circular bending direction, allowing diffusion of screw rays from center portion of an optical fiber section to its outer rim, and at the same time diversifying laser beam paths passing through an optical fiber and accelerating the diffused reflection at the locally bent plane with small radius curvature and further accelarating location changes of the disordered beam paths, a symmetrical and uniformalized laser beam is generated.

However, the ray which path is coincided with the bent direction of an optical fiber or similar one does not develop its uniformalization as well as screw rays in particular as shown in FIG. 1.

As the result, as the laser beam which symmetrizing and uniformalization is developed, accelerates uniformalizing by transformation into screw rays and diffused reflecion, by being projected on XY plane perpendicular to XZ plane followed by accelarating transformation of said rays and uniformalizing finally on YZ plane perpendicular to each XZ and XY plane, the laser beam projected on the optical fiber from all the directions is allowed to be conversed into screw rays.

And further, by supplementing three dimensionally double local bendings on each plane an uniformalized energy distribution throughout the whole section for the optical fiber is provided, balancing each other of incident angle change due to the circular and local bendings by specially supplementing the local bendings contrary to the direction of three dimensional circular ones prevents the incident angle of the laser beam at boundary surface between the core and clad from less critical incident angle for those of laser beam.

To symmetrize and uniformalize the laser beam as above, some required conditions such as designing of the bending radius of curvature considering lens design and the critical incident angle should be provided, and those neccessary requirements are further in details described.

1)incident condition and lens design

To minimize the incident loss for the laser beam, the triplet aplanatic convex lens capable of condensing with focus, 0.6 mm in diameter less than the core, 1 mm in diameter for the optical fiber is applied, and to prevent burning defect of the optical fiber section due to high energy level concentrated on the focus portion from condensing rays, the optical fiber section is installed at the location where the laser beam after condensing begins to be diffused.

And further to minimize reflection loss on the fiber incident surface when the laser beam is projected on the optical fiber, it keeps perpendicular to fiber incident surface, and also even in case of supplementing the bendings even after projected on the optical fiber, so that loss at the boundary surface between the core and clad due to some defective refractions may be preventive, the maximum incident angle is designed for less ⅓ of an allowable incident angle taking into account of the refraction rate of each core and clad.

Figure 3:
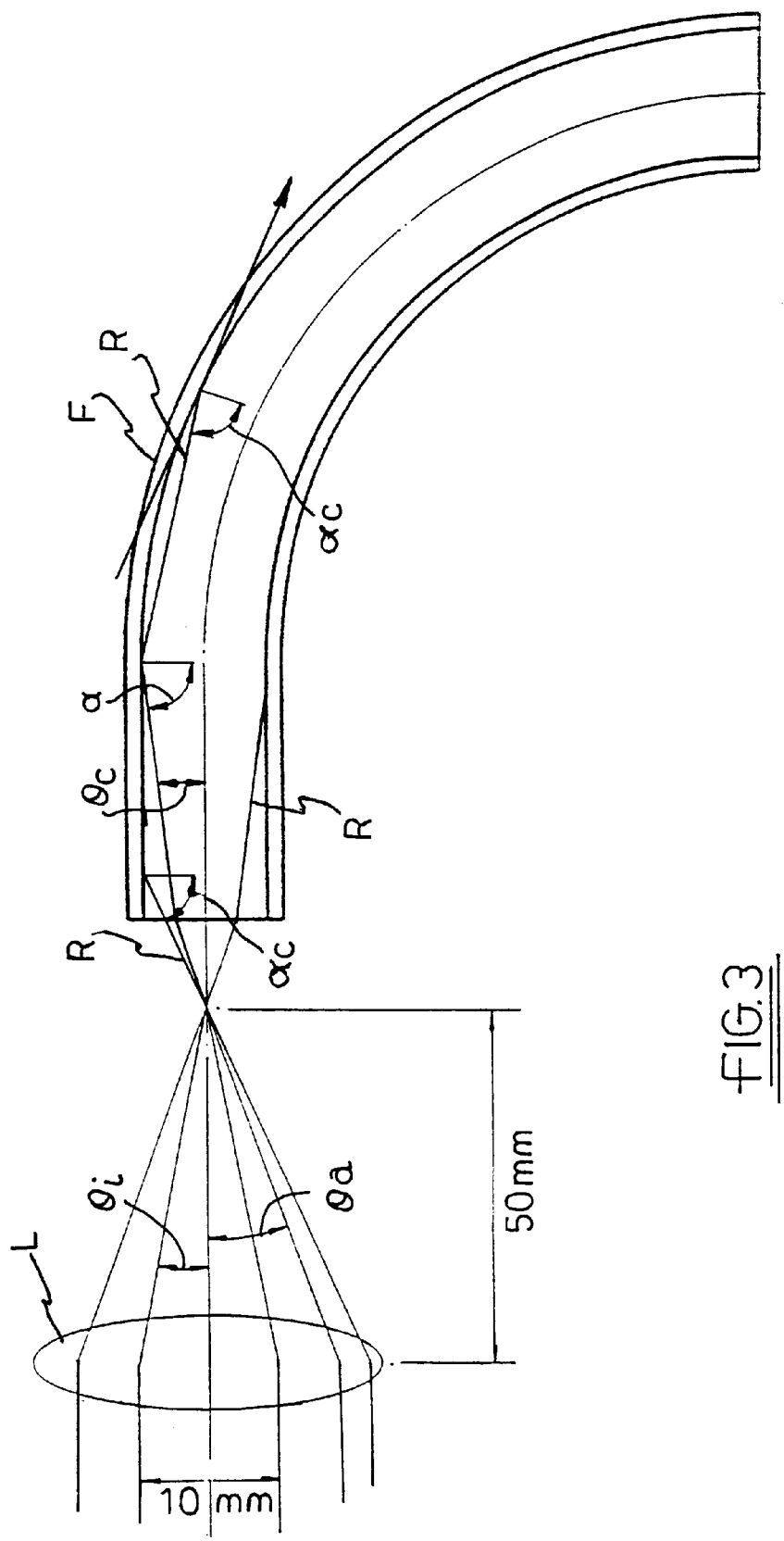
FIG. 3 shows a basic view of an optical design for minimizing laser beam loss projected upon an optical fiber.

FIG. 3 shows the process and design standard in which case a laser beam of about 10 in diameter, through a triplet aplanatic convex lens of 50 mm, focal length is projected, reflected on and passes through the optical fiber.

Now let the refraction rate of air, $n_0$ ($n_0$1), of the core, $n_1$, of the clad $n_2$, the follwing relation is eatablished between the allowable incident angle $\theta_a$, the critical refraction angle in the optical fiber $\theta_c$, the critical incident angle at the boundary surface between the core and clad;

$$\sin\theta_a/\sin\theta_c = n_1/n_0 = n_1$$

$$\sin\theta_a = n_1 \sin\theta_c \quad (1)$$

and also $$\sin\alpha_c = \cos\theta_c = n_2/n_1 \quad (2)$$

From an equation of $\cos^2\theta = 1-\sin^2\theta$, combining (1) and (2) relations ships the allowable incident angle($\theta_a$) is obtained as the following;

$$\sin\theta_a = n_1(1-\cos^2\theta_c)^{1/2}$$
$$= (n_1^2 - n_2^2)^{1/2}$$

Hence $\theta = \sin^{-1}(n_1^2 - n_2^2)^{1/2}$ (3)

In case of a step index optical fiber of quartz in general taking into consideration of about 1.45 of the core refraction rate, about 1.40 of the clad the allowable incidence angle $\theta_a$ from the equation (3) is obtainable as 22°.

As the invention provides with about 10 mm in laser beam diameter and 50 mm of the focal length for a triplet aplanatic convex lens, the practical incidence angle $\theta = \tan^{-1}(5/50) = 5.7°$ is obtained, as 26% of allowable incident angle($\theta_a$), the incident angle changes due to local bendings of the optical beams is fully taken into consideration of designing.

2) Designing the radius of curvature of bendings considering the critical incident angle.

The incident angle of the laser beam at the boundary surface between the core and clad due to circular and local bendings becomes further smaller, and in case the incident angle of the laser beam is less its critical angle, burning defect as well as energy loss is brought about. Therefore the invention designs each radius of curvature of the circular and double local bendings considering the critical incident angle change, incident angle change due to the local bendings for the optical fiber.

Now, substituting each refraction rate (n=1.45) and (n=1.4) of core and clad into equation (2), the follwing critical refraction angle($\theta_c$) and the critical incident angle ($\alpha_a$) are obtained;

$$\theta = \cos(n_2/n_1) = 15.1°$$

$$\alpha = \sin(n_2/n_1) = 74.9°$$

That is, if the refraction angle at all the locations in the optical fiber is less the critical angle(74.9°), some defective refractions are avoidable as the incident angle at the boundary surface between the core and clad maintains always larger than the critical angle(74.9°).

Figure 4:
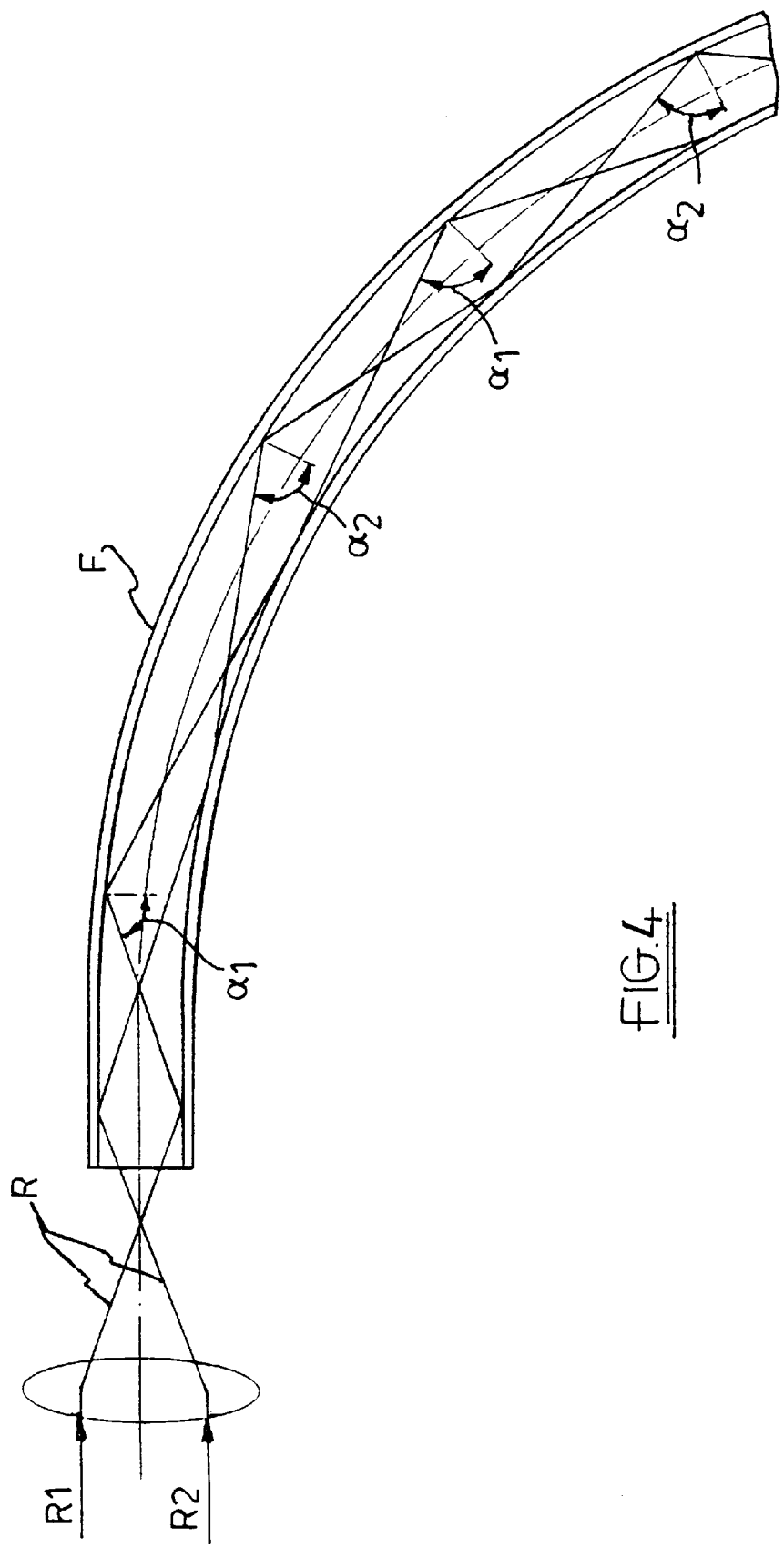
FIG. 4 shows a laser beam path characteristic line in case of a beam passing through an optical fiber under a curved bending.

Now, as shown in FIG. 4, in case the laser beam passing through an optical fiber under circular bending, assuming same radius of curvature and same plane for said fiber, as the incident angle along the direction of the fiber is not changed, even in case local bendings toward the same direction with the same radius of curvature are repeated, the incident angle of the beam is not reduced, and also in case of having different direction of the bendings screw rays only are accelerated. Thereby, the invention by directional changes of three dimensional profile accelerated screw rays, and in designing each critical refraction and critical incident angle, reduction of said incident angle due to the first circular bending, those of due to first local bending, and double bending in the reverse direction are each considered.

Now, assuming that maximum incident angle of the laser beam on the optical fiber, $\theta_i$, the reduced angle of incidence due to circular bending, $\alpha_r$, the reduced angle of incidence due to the local bendings toward the direction of circular bending $\alpha_b$, the increment of the refraction angle due to the double local bendings toward the reverse direction of the circular bending, $\alpha_d$, the combined incident angle at is allowed to be under the follwing conditions;

$$\alpha_{r1} = 90° - (\theta_i/n_1 + \alpha_r) > \alpha_c \quad (4)$$

$$\alpha_{r2} = 90° - (\theta_i/n_1 + \alpha_b) > \theta_c \quad (5)$$

$$\alpha_{r3} = 90° - (\alpha_r - \alpha_b) > \theta_c \quad (6)$$

Equation (4), one design standard taking into consideration of the circular bending, (5), of the incident angle and the local bendings, (6), of the local bendings toward those of circular bendings and double local bendings toward the reverse direction each are indicated.

Already as shown in FIG. 3, as under a laser beam length of about 10 mm and a focal length of 50 mm for a triplet aplanatic convex lens one practical incident angle ($\theta_i$) is 5.7°.

Figure 5:
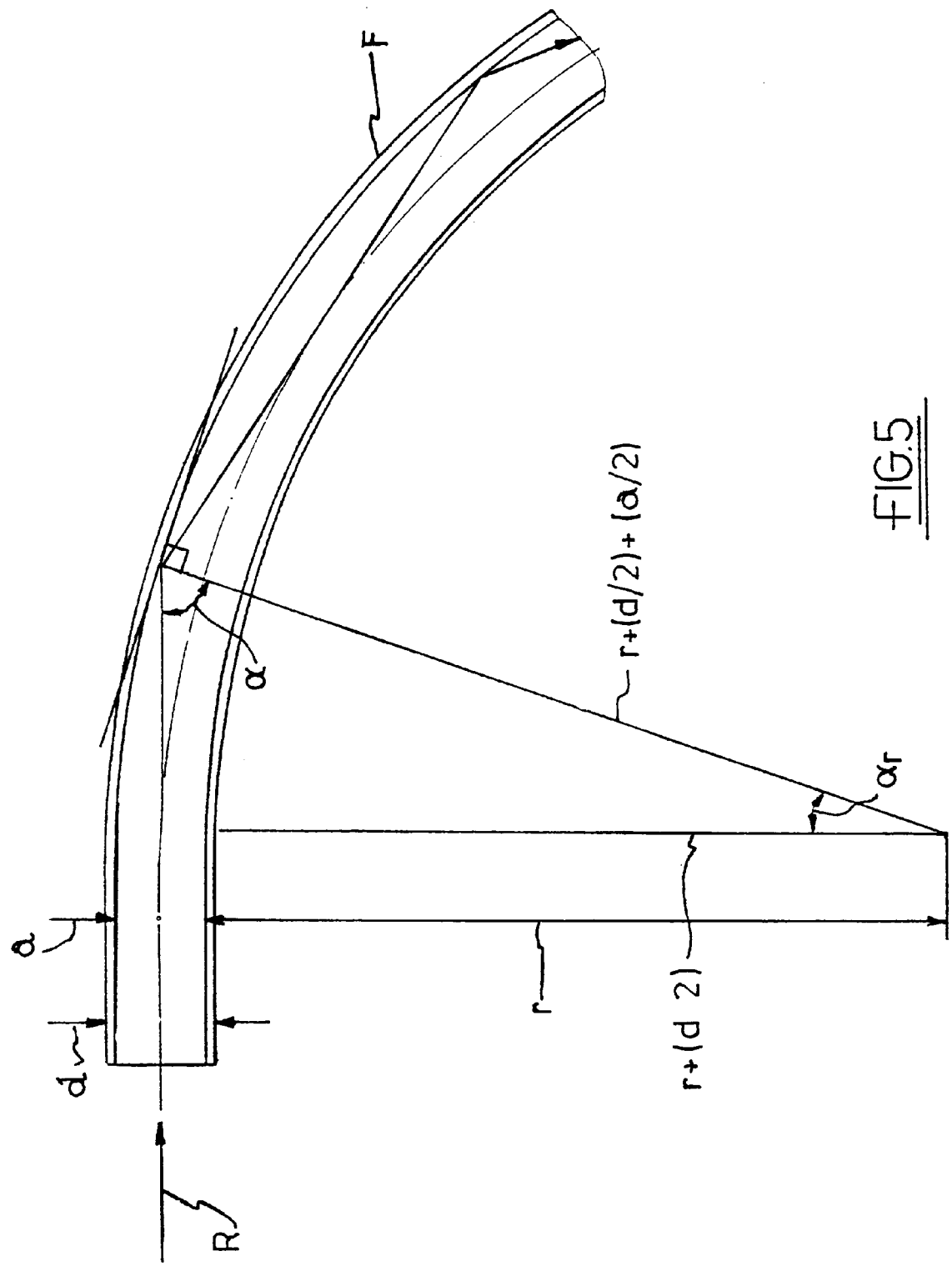
FIG. 5 shows a principle view of reduced incidence angle for a laser beam under bent optical fiber.

As FIG. 5 shows reduced incident angle due to the bending, assuming the radius of curvature of a bending guide and bending adusting element, r, the optical fiber diameter, d, the core diameter, a, then the decrement of the incident angle due to bending is introduce as follows;

$$\alpha_r = \cos^{-1}[(r+d/2)/(r+d/2+a/2)] \quad (7)$$

As the invention designed based on 120 mm of a circular bending guide, 60 mm of minimum radius of curvature of a local bending guide, 55 mm of minimum radius of curvature for an adjusting element of local bending in the reverse direction and further based on 2 mm of an optical fiber diameter, 1 mm of its core diameter, substituting those values into equation(7), each decrement angle for each incident angle due to the bendings shows $\alpha_r=5.2°$, $\alpha_b=7.3°$, $\alpha_d=7.6°$, and further, substituting said values into equations (4), (5), and (6), $$\alpha_{t1}=90°-(5.7°/1.45+5.2°)=80.9°>\alpha_c$$

$$\alpha_{t2}=90°-(5.7°/1.45+7.3°)=78.8°>\alpha_c \quad (8)$$

$$\alpha_{t3}=90°-(7.3°+7.6°)=75.1°>\alpha_c$$

which values are provided with one of the optimal design conditions because of each value over the critical incident angle($\alpha_r=74.9°$). Especially as $\alpha_{t3}$ is coming from the double local bendings tward the reverse direction of the circular bending, they are balanced each other and mostly the maximum incident angle becomes less than $\alpha_{t2}$, however considering the safety factors $\alpha_{t3}$ is consdered.

The device designed for uniformalizing a laser beam by said method is described referring to the drawings.

Figure 6:
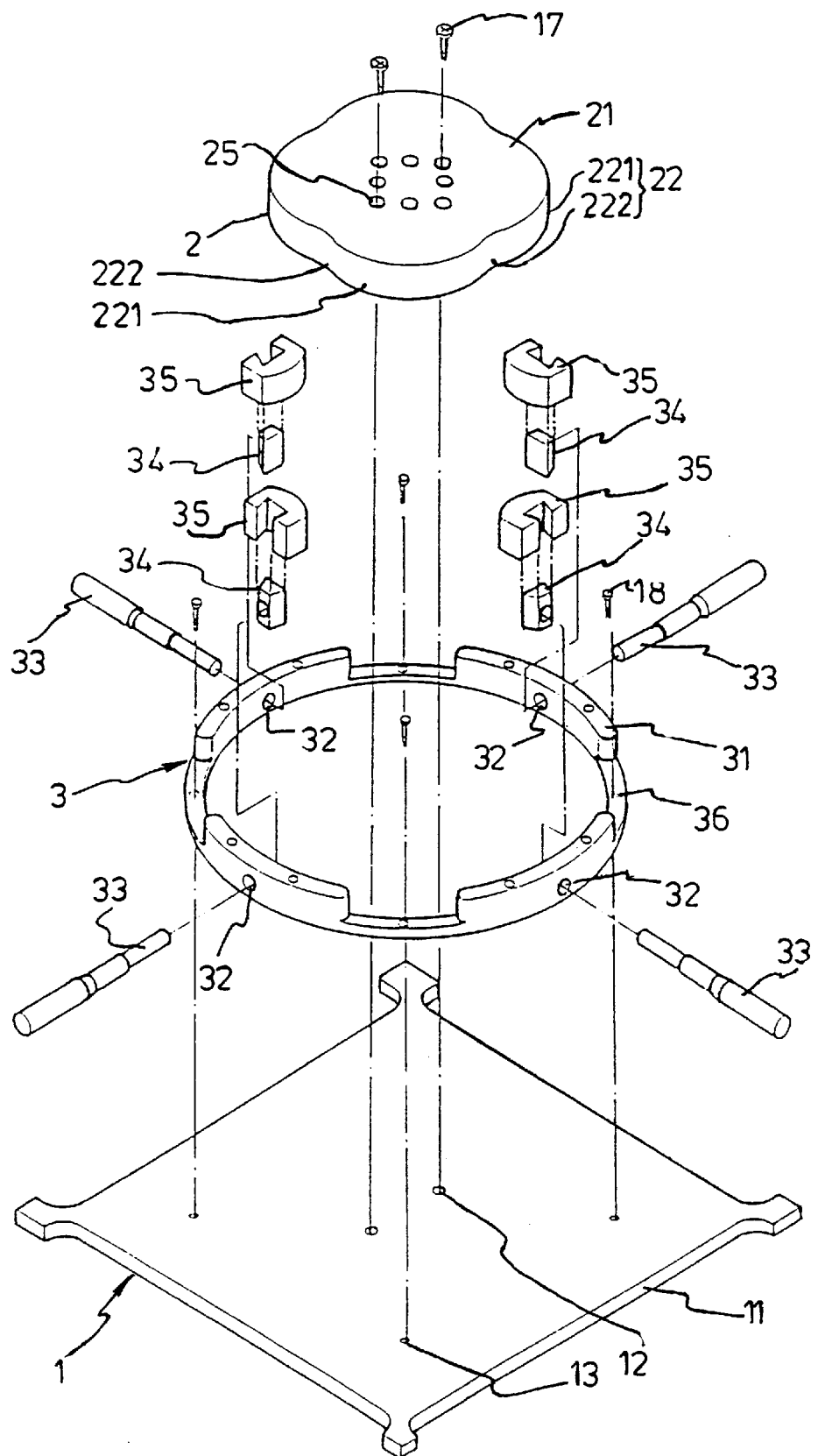
FIG. 6 shows a dismantled perspective view for the bending portion of a device for generating an uniformalized laser beam.
Figure 7:
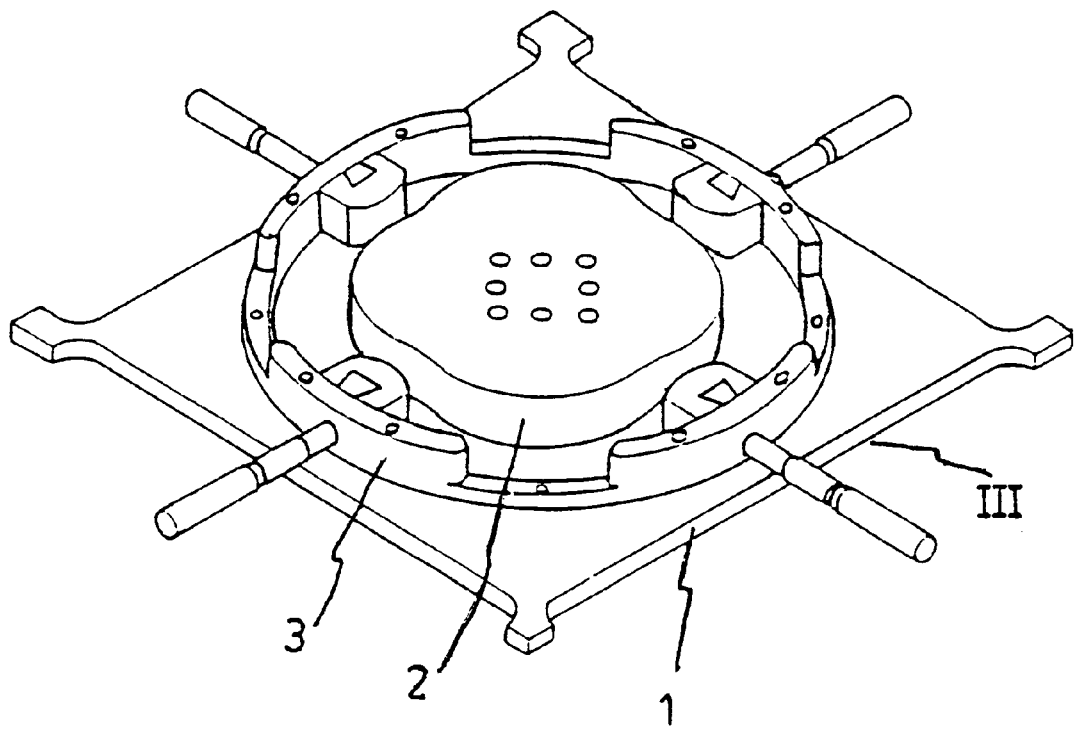
FIG. 7 shows an assembly perspective view for the bending portion of a device for generating an uniformalized laser beam.

FIG. 6 and FIG. 7 show formation of one bending portion(1st bent portion) of circular bending portion from a large circle on a surface(1st plane) and local bending portion (1st bending portion)from a smaller circle as one part of the device for generating an uniformalized laser beam according to the invention in each disassembled and assembled view.

The bending portion forms one base plate(1) on which a bending guide(2) winding and suspending an optical fiber provided with each circular and local bendings, and an adjusting portion(3) for transforming an optical fiber wound around those of local bending of said bending portion into the local bending form are each other fixed, and in case of arranged optical fiber(F) along said bending guide(2), due to to a specific form characters from the cirular, and the local bendings monuted in the reverse direction of said circular bending a local bending toward the circular bending direction is automatically developed between the two adjacent local bendings, providing so called double local bendings with those of each reverse direction in sucession.

The base plate(1) forms the body(11) of a plate on which holes(12 and 13) for fixing said bending guide(2) and adjusting portion for local bending(3) are drilled and adjusting set screws(17 and 18) are provided.

The circular bending guide(2) winding and suspending the optical fiber so that three dimensional circular and local bendings may provided with to obtain some diffusion effects due to the development of screw rays and diffused reflections, forming one body(21) of a plate with a definite thickness around surface plays a bending surface(22) winding an optical fiber which bending surface(22) is provided with each surface(221, 222) for both circular and local bending.

As a means of forming said bending surface(22), shaping the body(21) into a true circle of a definite radius of curvature followed by providing a circular arc of the smaller radius of curvature less than the diameter of said circle, around which circumference surface at regular intervals is drawn, and further a portion of said circle along said smaller arc is cut, then said arc surface plays a local bending surface(222), menwhile a larger arc portion(remaining circumference surface of said circle) by setting up a boundary with a local bending surface(222) plays a circular bending surface. And hole(25) on said body(21) for mounting a fixing tool(17) is drilled. As the adjusting portion for the local bending(3) provided to develop some diffused reflections by holding an optical fiber closely adjacent to the local bending surface(222) of said bending guide(3) on the local bending surface(222), it forms a suspending body(31) by allowing a larger diameter than of said bending guide(2), around which a mounting hole for an adjusting lever at the location facing a local bending surface(222) of said bending guide(2) is drilled, Each adjusting lever for the local bending (33) is inserted into each hole(32) so as to adjust its length, provided with a bracket(34) at the end of a local bending adjusting lever(33), a local bending adjusting element(35) is to be mounted, and further in FIG. 6 an example of practical application of said local bending adjusting lever(33) built up of micrometer at which spindle end a local bending adjusting element(35) is inserted.

And said body(31) is provided with a mounting hole(36) drilled for assembling a fixing tool(18).

Figure 8:
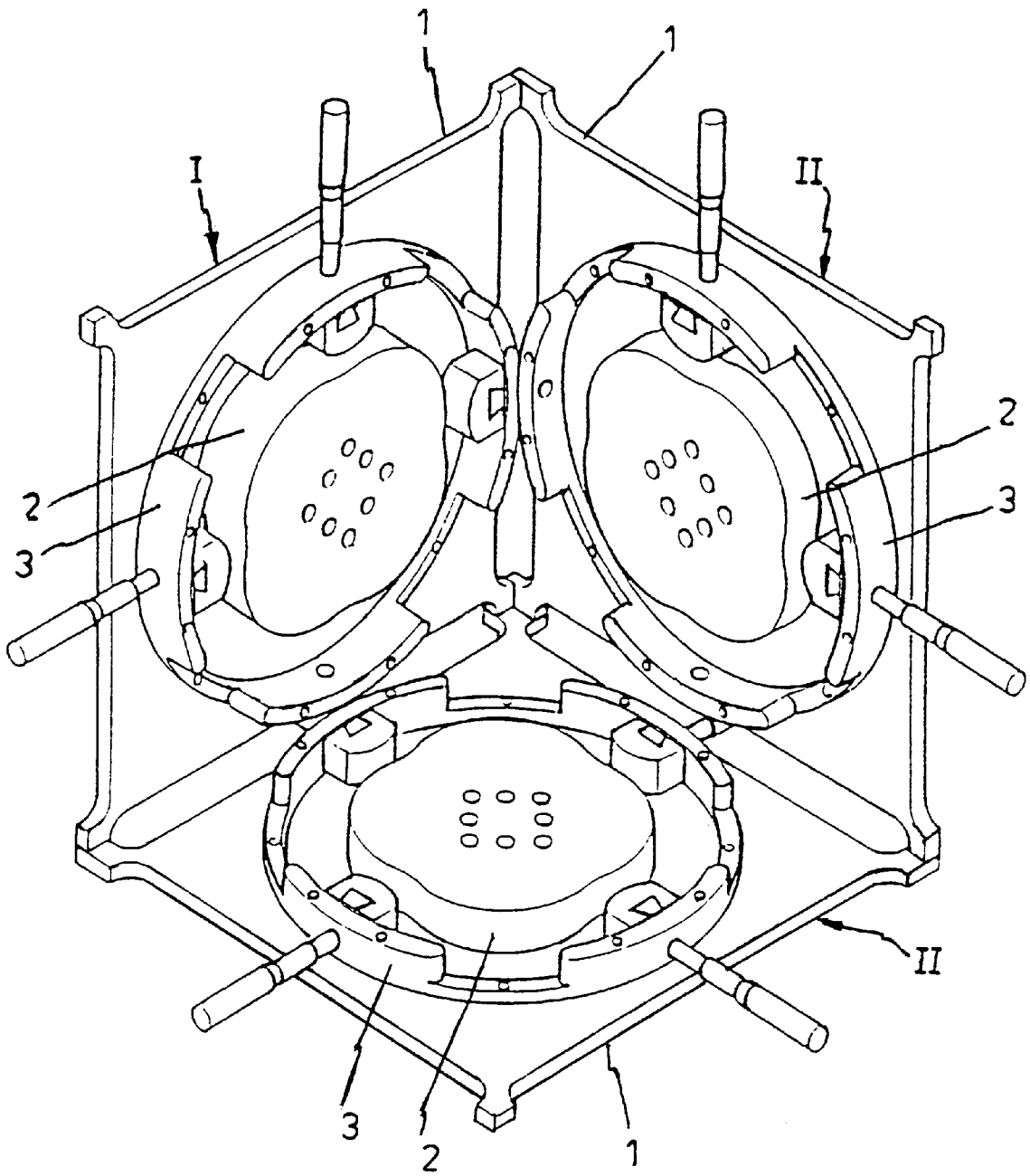
FIG. 8 shows an assembly perspective view for a device for generating an uniformalized laser beam.

FIG. 8 shows an example of practical application of a device for uniformalizing a laser beam, where three bending portions as indicated in FIG. 7 are arranged and mounted mutually perpenducular to one after another, each bending portion for the 1st (I), 2nd (II) and 3rd (III) provided with three base plates(1, 1, 1) vertically matched with one after another by wel ding or fixing by the fixing tool, thus for each bending portion such as for 1st(I) on XZ plane, 2nd(II) on XY plane and 3rd(III) on YZ plane each are situated.

Figure 9:
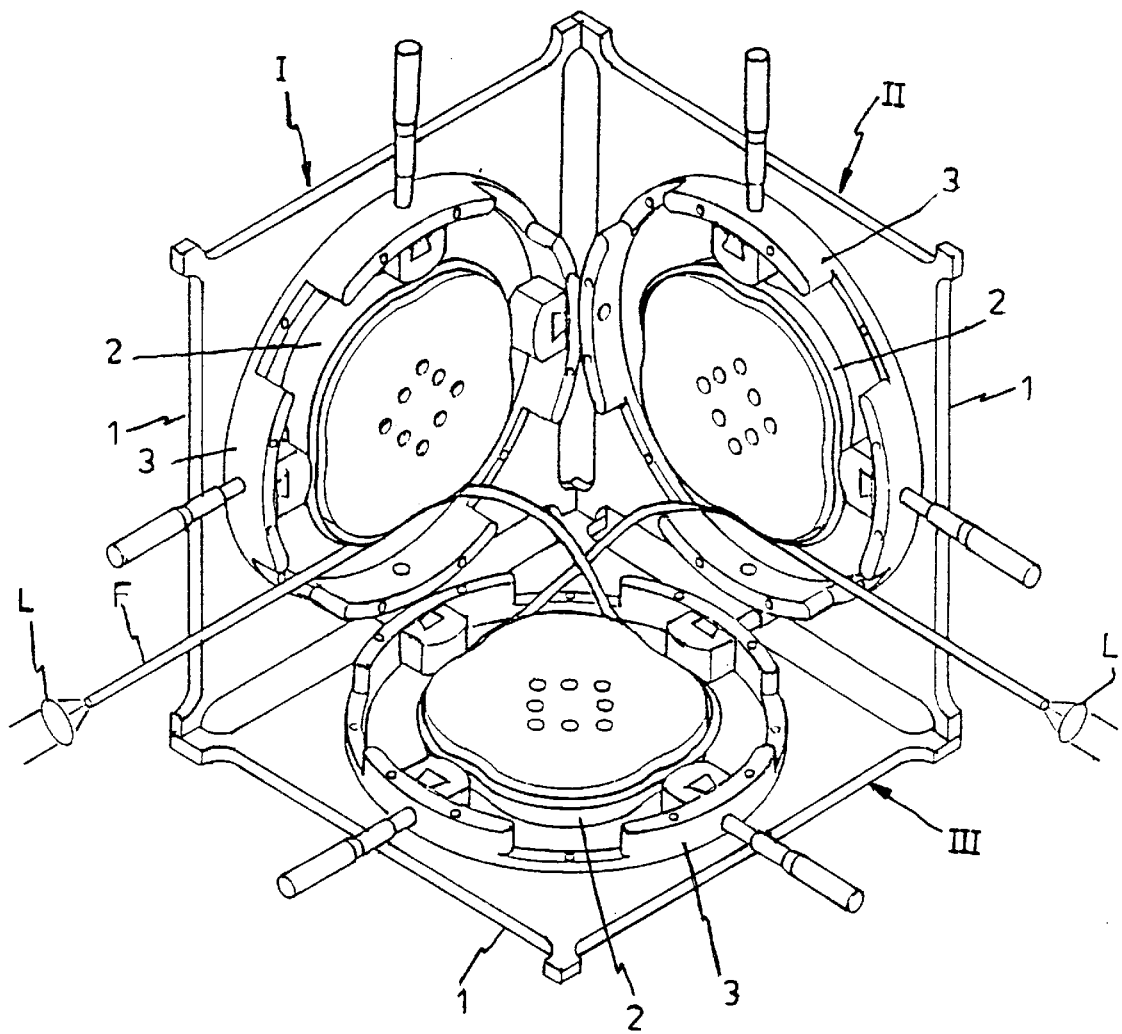
FIG. 9 shows an assembly perspective view of a device for generating an uniformalizing laser beam to prove the invention.

FIG. 9 shows a device for uniformalizing a laser beam passing throgh a winded optical fiber(F) around the circular (221) and local bending surface(222) of the bending guide (2) as in said three bending portions.

In said device for uniformalizing the laser beam, the condensed laser beam(R) projected on the incident surface of an optical fiber(F) mounted at the 1st bending portion through a triple aplanatic convex lens(L), said beam(R) during passing through a bending guide(2) for the 1st bending portion(I), is diffused and reflected to the sectional direction and accelerated increment of screw rays, and also during passing through the circumference of each bending guide(2) for 2nd (II) and for 3rd bending portion(III) mounted mutually perpendicular to the bending guide(2) of the 1st (I), the laser beam projected from all the directions are diffused and accelerated increment of screw rays at the same time leading to the whole uniformalization.

Figure 10:
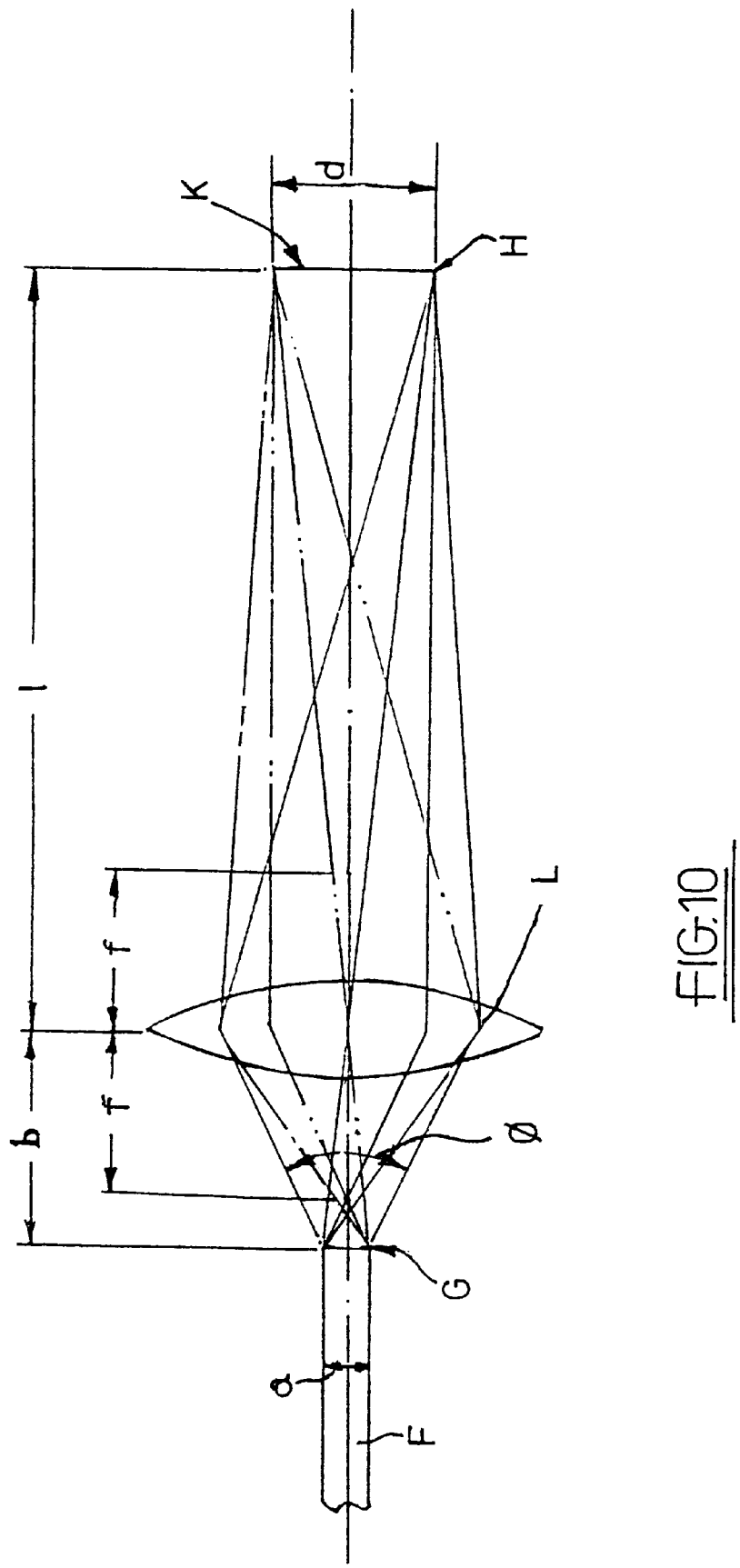
FIG. 10 shows a method of adjusting laser beam size by projecting an uniformalized laser beam on a target area.

In FIG. 10 as the laser beam under an uniformalized enenrgy distribution through the output section adjusted to an adequate value through a triplet planatic covex lens follwed by focusing into an adequate image on the projected location, by which machining or measurement of the inudtrial materials are appliable, a method of adjusting so as to be focused with adequate projected size(d) at the outlet section(G) of an optical fiber(F), where requires an uniformaized distribution is shown.

Now, assuming that a, diameter of optical fiber core, $\phi$, diffusivity angle of laser beam, h, effective diameter of a triplet aplanatic convex lens, f, focal length, b, distance from the output section(G) to the lens(L), l, distance from lens(L) to adequate projected location(H), d, adequate size of the projected surface, the follwing equations are set up;

$$1/l+1/b=1/f, \quad d/a+l/b \text{ therefore}$$

$$d=a\times l/b=(l/f-1)a \quad (9)$$

Also as a laser beam is to pass through less effective diameter of a triplet aplanatic convex lens, the following condition must be satisfied;

$$a+b\phi \leftarrow h \qquad (10)$$

Figure 11:
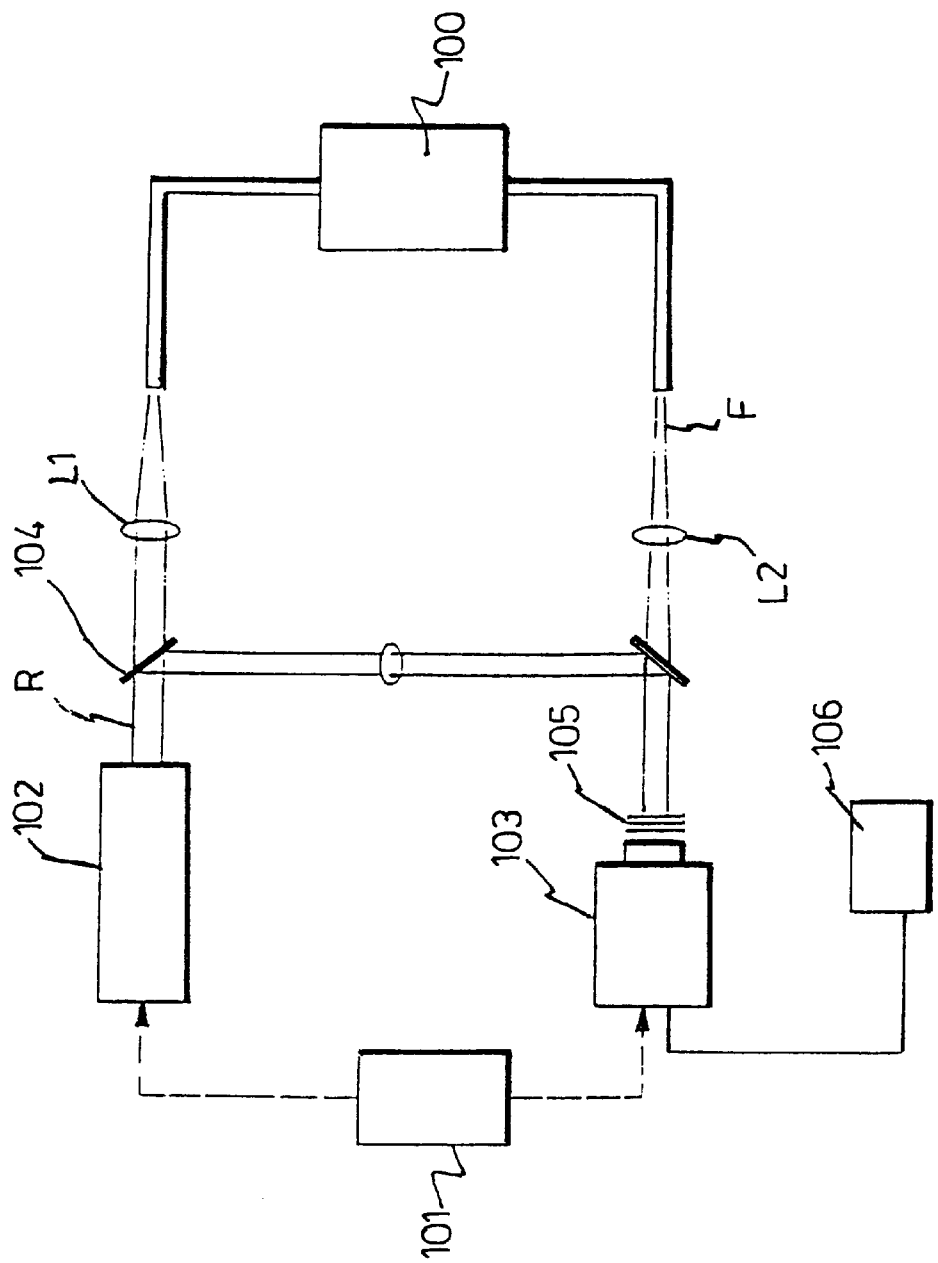
FIG. 11 shows a construction view of a measuring system for an energy distribution for and after an uniformalization of a laser beam.

FIG. 11 shows a functional diagram of a beam profile measurement system for measuring the sectional energy distribution, wherein, in case a synchronizing signal generator(101) transfers the synchronizing signal to the laser head(102) and CCD camera(103), emissioning of laser beam from the laser head(102) and momentary photographing by CCD camera are perfomed at the same time, the laser beam(R) emissioned from the laser head(102) is seperated into two laser beams(R) by the beam seperator(104); one(R) of which beam size is adjusted by a triplet aplanatic convex lens(L1) under non uniformalized state and after its transmitted light luminace being adjusted by the filter(105) irradiated to CCD camera(103). The distribution profile for the laser beam photograped by CCD camera(103) is imaged by the personal computer(106) which can analyze its data. Further the other seperated beam(R), after being condensed by a triplet aplanatic convex lens(L1) is put into an optical fiber(F) and the laser beam during passing through a device (100) for uniformalizing organized together with the optical fiber system is transformed into a beam(R) under an uniformalized energy distribution and emissioned out from the optical fiber(F). The value of an uniformalized laser beam emissioned(R) is adjusted by a triple aplanatic convex lens(L2) and through a filter(105) its transmitted light luminance is also adjusted, which distribution profile the laser beam(R) is photographed by CCD camera(103), and is imaged by the personal computer(106) capable of analyzing the data.

In case of photographing, two CCD cameras or one CCD only by turns may be used.

Figure 12:
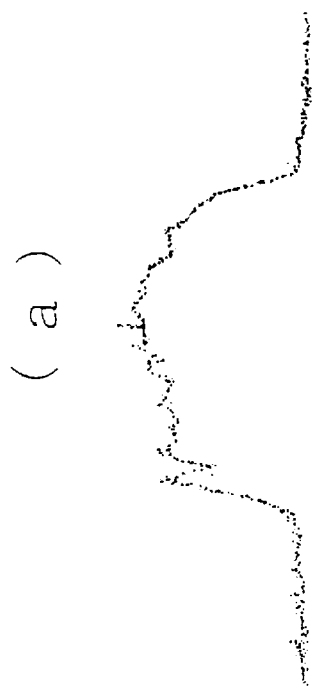
FIGS. 12(a) and (b) shows two comparison pictures for and after an uniformalization of a laser beam demonstrating an effectve result for the invention.
Figure 12:
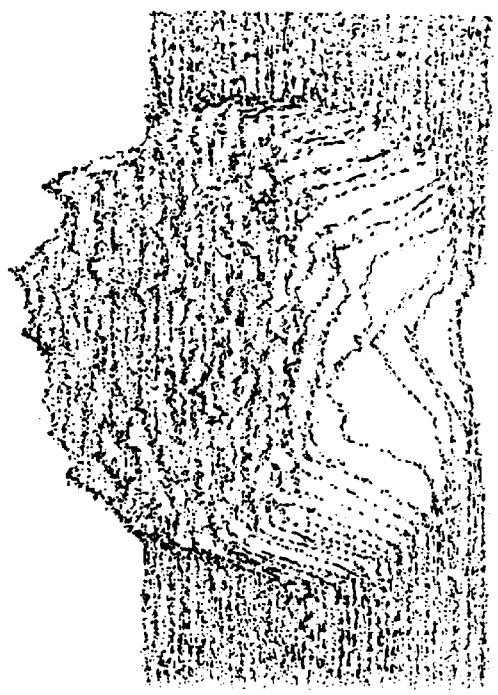
Figure 12:
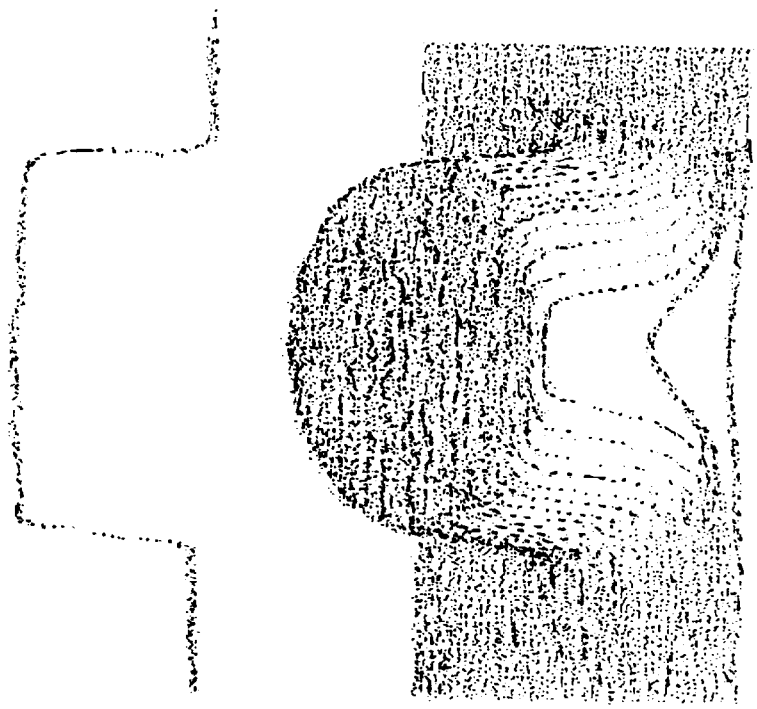

FIG. 12 shows the performance of an uniformalizing device according to the invention, where (a) indicates one dimensional energy distribution against the laser beam center line prior to uniformalization and two dimensional energy distributions througout the whole section, and (b), indicating one dimensional energy distributions uniformed at the center line for an uniformalized laser beam and two dimensional energy distribution throughout the whole section passed through the device for uniformalizing the laser beam.

The ordinary laser beam prior to an uniformalization indicated in FIG. 12(a) due to its high energy level and non symmetrical energy distribution, in case of applying said beam for the measurement system, higher deviation of the energy level(approximately 5% in the case of measuring the heat diffusivity) is occurred, therefore an impovement of precise machining or productivity is found to be diffcult, and further even though applied to the special welding for the thinn plate etc or heat treatment, some improved qualities have many obstacles mostly from the non uniformed energy distributions of the beam.

An improved laser beam developed as shown in FIG. 12(b) according to the invention is symmetrical throughout the whole the section and has an uniformalized energy distribution, the deviation level of measuring can be considerably enhanced and further in case applying to cutting, drilling etc of the industrial materials, improving of the productivity as well as higher precise machining could be expected. Further even in case of applying to marking or welding, heat treatment etc, the possiblities of more precise and uniformed working by eliniminating some defects caused by the non uniformalized laser could improve their quality and productivity.

Figure 13:
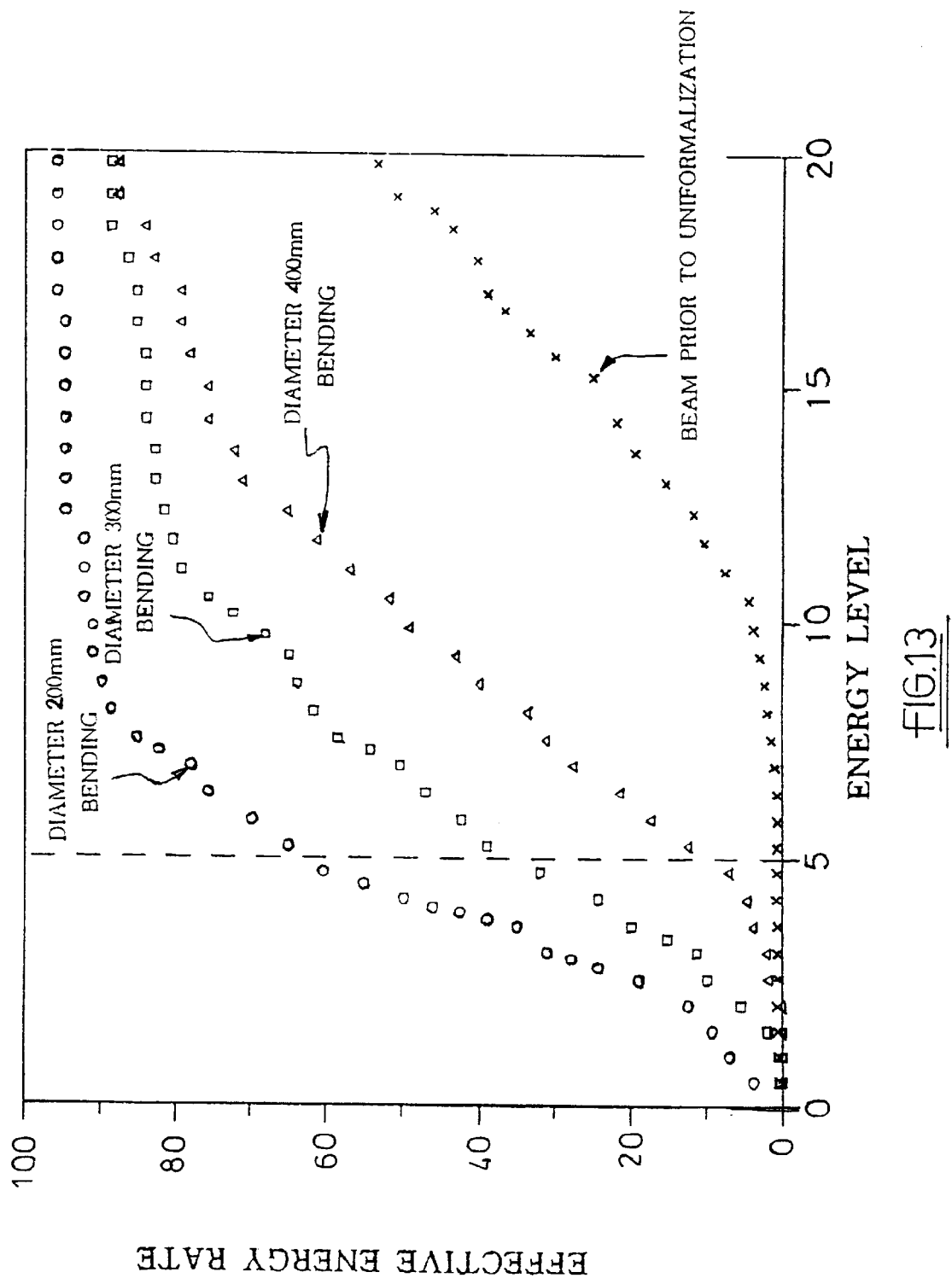
FIG. 13 shows a graph indicating each uniformalized laser beam effect for each diameter under one dimensioanl circular bendings.

FIG. 13 idicates the result of reviewing an effective energy comparison by allowable deviation to the maximum energy level by measuring the laser energy distribution at an optical fiber section attended with change of winding diameters of cirular optical bendings to verify the uniformalizing effect for the laser beam due to the circular bendings.

The YAG laser passed through an optical fiber applied attended with change of winding diameters each with 400 mm, 300 mm and 200 mm by directional bending additonally twice with a step index optical fiber of 1 mm of core diameter, 5 m of length.

In case comparing each effective energy of approximate 5% deviation in consideraion of precise measurement and machining, the beam before the uniformalization has lttle effective energy, on the other hand, in case of bending an optical fiber at 400 mm of diameter, approximate 10% of effective energy may be utilized, for smaller diameter of 200 mm, more than 60%. As the result, it is recgnized that the uniformalization of laser beam is positively improved by the circular winding of the optical fiber.

Figure 14:
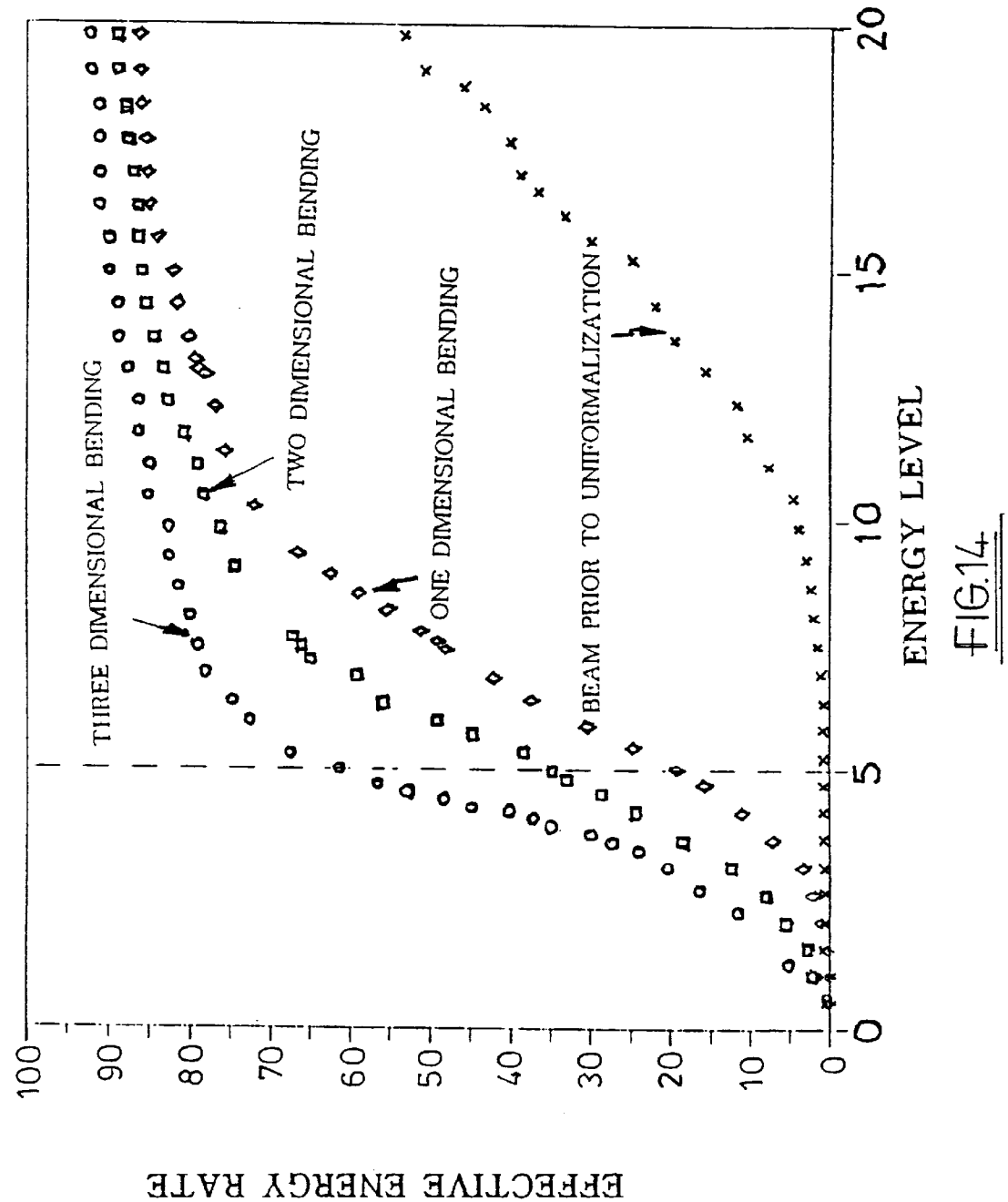
FIG. 14 shows a graph indicating each uniformalized laser beam effect under each one, two and three dimensional circular bendings.

FIG. 14 shows an effective energy rate distribution for the laser beam. in case of spplementing one dimensional three circular bendings, those of two dimensional and further of three dimensional each at 400 mm diameter with a graph for an experimental result verifying an effective uniformalization by applying three dimensional bendings.

Considering a required deviation of energy level as 5%, the quantity of the effective energy rate is increased at the 1st bending from approximate 20% only rapidly to over 60% at three dimensional bendings proving the effective uniformalization of the laser beam.

Figure 15:
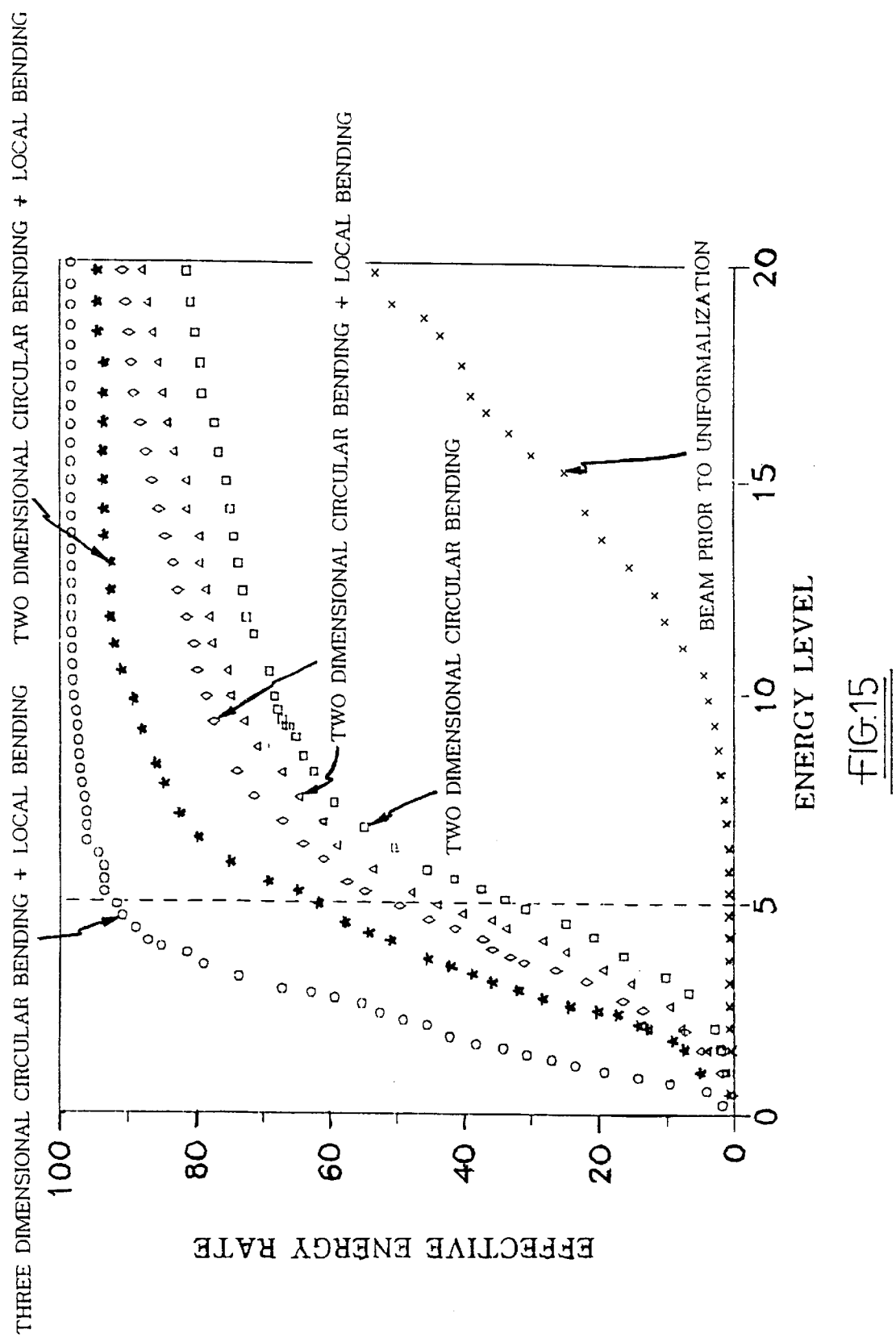
FIG. 15 shows a graph indicating each uniformalized laser beam effect under local bendings and three dimensional double bendings.

FIG. 15 shows a measuring results for a changing trend of the laser beam distribution based on the number of increase for local bendings increasing to three times local bendings of 60 mm in radius of the curvature toward the direction of windings in additon to two dimensional three windings of 400 mm in diameter under which in two dimensional three windings only the effective energy of approximate 5% is no more than 30%, but as a result of supplementing three times local bendings more with 60 mm in the radius of curvature, the effective energy is increased up to over 60%. This verifies that uniformalizing of the beam may be accelerated in case of local bendings supplemented toward the reverse direction of circular bendings.

As each circular, three dimensional and local bending are proved to be effective for uniformalizing the laser beam, based on the experimental result by manufacturing three dimensional double bending device of 60–70 mm in the radius of curvature for the local bending in addition to the circular bending of 240 mm in diameter, an excellent uniformalized laser beam by such as three dimensional circular bending +6 local bendings(6) as shown in FIG. 15. could be generated. The uniformed laser beam generated by applying three dimensional double bending device which energy level over 90% is distributed in the energy deviation range of 5% proves a very effective and compatiable performance for the precise measurement and machining.

Figure 16:
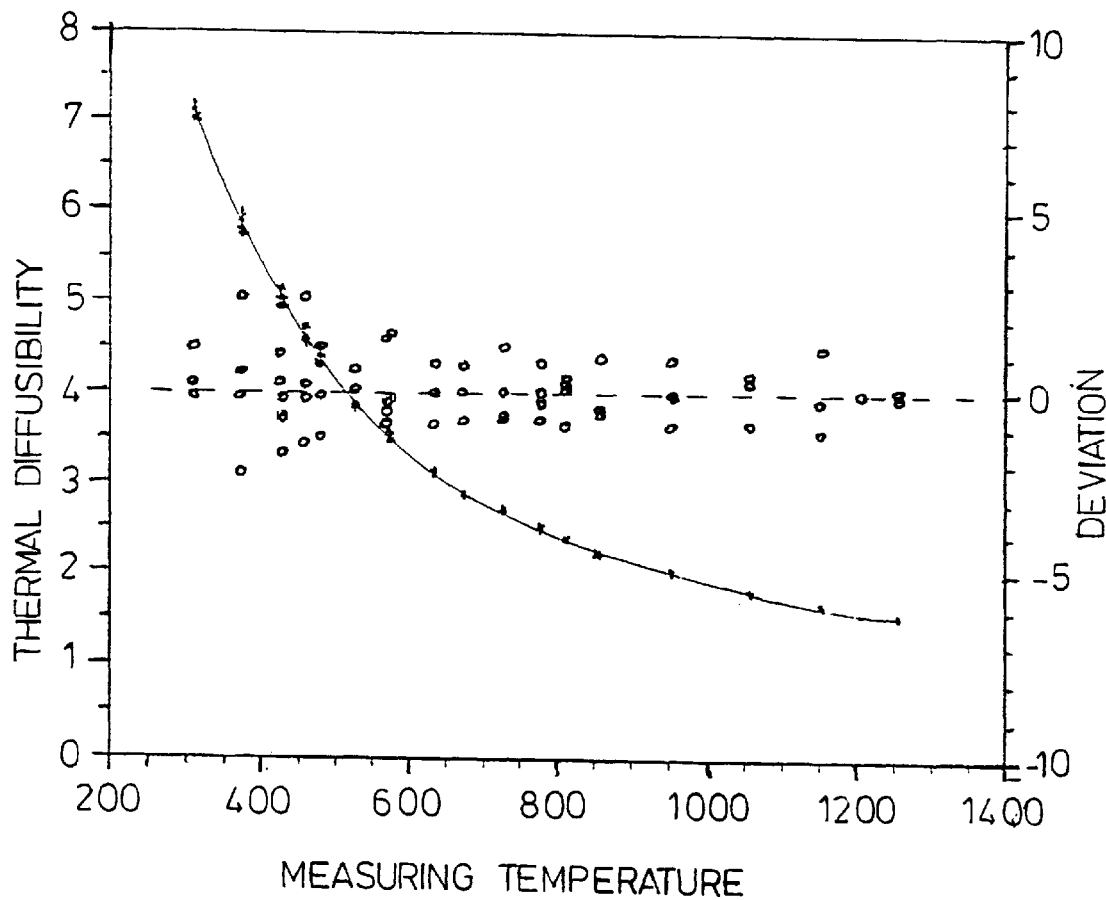
FIG. 16 shows a graph indicating a measuring result of thermal diffusivity for the standard carbon by utilizing an uniformalized laser beam based on the invention.

FIG. 16 shows a measuring result for thermal diffisivity of the graphite(POCO AXM-5Q1) used as a standard material by an uniformalized laser beam obtained based on the invention and in view of acceptable total measuring dispersion in the range of ±3%, of the deviation from the curve of median ranged in ±0.5% and considering the deviation acceptable by the non uniformity ranged in 5%, the uniformalizing effect has been proved to be very excellent.

What is claimed is:

1. An uniformalized laser beam comprising:
the focal point being minimized by passing through a triplet aplanatic convex lens, a condensed laser beam passing through an optical fiber, the beam passing through a fiber bent by the circular bending form in the 1st, 2nd plane(and 3rd plane) mutually perpendicular installed, is uniformalized by accelerating increment of screw rays and diffused reflections of the beam, by which the laser energy located at the center portion is uniformly dissipated throughout the whole the section.

2. A method for generating an uniformalized laser beam comprising:

the focal point being minimized by passing a laser beam through a triplet aplanatic convex lens, futher said beam, passing through an optical fiber, and through the fiber system bent in circle each in the 1st and 2nd plane perpendicular to 1st plane in turn, followed by being uniformalized by accelerating screw rays and by diffused reflections, thereby the laser energy condensed at its center portion being dissipated throughout the whole section, as the result, an uniformalized beam is generated.

3. A method for generating an uniformalized laser beam comprising:

the focal point being minimized, thereby condensed beam passing through an optical fiber, further through each fiber bent in circle in the 1st, 2nd plane perpendicular to the 2nd and the 3rd plane mutually perpendicular to said 1st and 2nd in turn, By accelerating increment of screw rays and diffused reflections of the beam, the laser energy being dissipated, thereby an uniformalized laser beam is obtained.

4. A method for generating an uniformalized laser beam as claimed in one of claims 2 or 3 wherein said condensed laser beam by a convex lens being focused perpendicular to the incident section of a fiber, in case the vertically arranged beam is incident on the fiber, loss of incident rays by the reflection on the incident plane can be minized.

5. A method for generating an uniformalized laser beam as claimed in one of claims 2, or 3, by installing the optical fiber sections just in front and rear of the laser beam focused by said convex lens, burning defect for said sections is preventive.

6. A method for generating an uniformalized laser beam as claimed in one of claims 2 or 3, wherein said laser beam designed for being condensed through a convex lens, and an optical fiber system of the circular bending each of the 1st and 2nd plane, in addition to supplementing each local bending in the reverse direction of less tangential length and the radius of curvature than the circular bending, develops screw shaped rays being dissipated from the section center to the rims, and at the same time, diffused reflections are achieve in the local bending portions of smaller radius of curvature, followed by diversifying each ray path and accelerating location changes for the ray paths passing through, the laser beam is symmetrically arranged and uniformalized.

7. A method for generating an uniformalized laser beam as claimed in one of claims 2 or 3, the maximum incident angle in case said laser beam condensed through a convex lens is projected on the optical fiber, said angle is restricted to less $\frac{1}{3}$ of an allowable incident angle considering the refraction rate of the core and clad for said fiber, and even if some bendings are supplemented after the laser beam is projeceted upon the fiber, the loss due to the defective refractions on the boundary surface between core and clad is avoidable.

8. A method for generating an uniformalized laser beam comprising: One base plate is formed, on the base plate(2), one bending guide(2) which winds and suspends some circular and local bendings, and also an adjusting portion(3) making said local bending portion of said bending guide(2) are each fixed, and the bending portion is formed, by arranging and fixing said two bendings perpendicular each other, the optical fiber(F) is wound along said bending guide surface for two bending portions.

9. A method for generating an uniformalized laser beam comprising:

one base plate(2) on which bending portions are formed by fixing a bending guide(2) winding and suspending the optical fiber along the circular and local bendings, and a local bending adjusting portion(3), are availabe, and by arranging and fixing said three bending portions mutually perpendicular to each the optical fiber(F) is arrayed along the said guide surface of those three bending portions.

* * * * *